(12) United States Patent
Fochtman et al.

(10) Patent No.: US 10,982,634 B2
(45) Date of Patent: Apr. 20, 2021

(54) PUMP VALVE CONFIGURATION AND ASSEMBLY METHOD

(71) Applicant: Continental Automotive Systems, Inc., Auburn Hills, MI (US)

(72) Inventors: James Fochtman, Williamsburg, VA (US); John Walters, Williamsburg, VA (US); Tyler Craven, Norfolk, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 123 days.

(21) Appl. No.: 16/025,268

(22) Filed: Jul. 2, 2018

(65) Prior Publication Data

US 2019/0003605 A1 Jan. 3, 2019

Related U.S. Application Data

(60) Provisional application No. 62/528,412, filed on Jul. 3, 2017, provisional application No. 62/528,345, filed
(Continued)

(51) Int. Cl.
*F04B 53/10* (2006.01)
*F16K 15/14* (2006.01)
(Continued)

(52) U.S. Cl.
CPC ............ *F02M 37/08* (2013.01); *F02M 37/10* (2013.01); *F02M 51/04* (2013.01);
(Continued)

(58) Field of Classification Search
CPC .............. F04B 53/1035; F04B 53/1087; F04B 53/103; F04B 53/1032; F04B 23/021;
(Continued)

(56) References Cited

U.S. PATENT DOCUMENTS

| 2,971,531 A | 2/1961 | Jurs et al. |
| 3,613,718 A | 10/1971 | Ballinger |

(Continued)

FOREIGN PATENT DOCUMENTS

| DE | 1809954 A1 | 5/1970 |
| DE | 102011005487 A1 | 5/1970 |

(Continued)

OTHER PUBLICATIONS

Translation of JPS57171 (Year: 1982).*
(Continued)

*Primary Examiner* — Charles G Freay
*Assistant Examiner* — David N Brandt

(57) ABSTRACT

A fluid pump valve assembly includes: a valve body; a fluid inlet and a fluid outlet defined in the valve body; an inlet disk and an outlet disk movably disposed in the valve body; and a valve seat fixed within the valve body and including a disk member including at least one first aperture defined axially through the disk member, and at least one second aperture defined axially through the disk member, the inlet disk and the valve seat forming at least part of an inlet valve and the outlet disk and the valve seat forming at least part of an outlet valve. An inlet chamber is disposed upstream of the inlet valve, a pump chamber is disposed between and in fluid communication with the inlet valve and the outlet valve, and an outlet chamber is disposed downstream of the outlet valve. The inlet chamber surrounds the outlet chamber.

24 Claims, 7 Drawing Sheets

Related U.S. Application Data on Jul. 3, 2017, provisional application No. 62/528,348, filed on Jul. 3, 2017, provisional application No. 62/528,351, filed on Jul. 3, 2017, provisional application No. 62/528,356, filed on Jul. 3, 2017, provisional application No. 62/528,417, filed on Jul. 3, 2017.

(51) Int. Cl.

| | | |
|---|---|---|
| *F02M 37/08* | (2006.01) | |
| *F16K 31/06* | (2006.01) | |
| *F02M 37/10* | (2006.01) | |
| *H01F 7/08* | (2006.01) | |
| *H01F 7/16* | (2006.01) | |
| *F02M 59/46* | (2006.01) | |
| *F02M 51/04* | (2006.01) | |
| *F02M 63/00* | (2006.01) | |
| *F02M 59/10* | (2006.01) | |
| *F04B 23/02* | (2006.01) | |
| *F02M 55/00* | (2006.01) | |
| *F04B 39/10* | (2006.01) | |
| *F16K 1/42* | (2006.01) | |
| *F16K 15/02* | (2006.01) | |
| *F16K 27/02* | (2006.01) | |
| *F04B 17/04* | (2006.01) | |
| *F02M 51/06* | (2006.01) | |
| *F02M 59/36* | (2006.01) | |
| *B21D 39/06* | (2006.01) | |
| *F02M 37/54* | (2019.01) | |
| *F02D 41/30* | (2006.01) | |
| *F02M 37/04* | (2006.01) | |

(52) U.S. Cl.
CPC ...... *F02M 51/0614* (2013.01); *F02M 55/007* (2013.01); *F02M 59/10* (2013.01); *F02M 59/367* (2013.01); *F02M 59/462* (2013.01); *F02M 59/464* (2013.01); *F02M 59/466* (2013.01); *F02M 63/0019* (2013.01); *F02M 63/0078* (2013.01); *F04B 17/04* (2013.01); *F04B 23/021* (2013.01); *F04B 39/1046* (2013.01); *F04B 53/10* (2013.01); *F04B 53/103* (2013.01); *F04B 53/109* (2013.01); *F04B 53/1032* (2013.01); *F04B 53/1035* (2013.01); *F04B 53/1087* (2013.01); *F16K 1/42* (2013.01); *F16K 15/02* (2013.01); *F16K 15/028* (2013.01); *F16K 15/14* (2013.01); *F16K 27/0209* (2013.01); *F16K 31/0689* (2013.01); *H01F 7/081* (2013.01); *H01F 7/1607* (2013.01); *B21D 39/06* (2013.01); *F02D 41/3082* (2013.01); *F02M 37/043* (2013.01); *F02M 37/54* (2019.01); *F02M 2200/8053* (2013.01)

(58) Field of Classification Search
CPC .. F04B 23/025; F04B 53/109; F04B 39/1046; F04B 17/044; F04B 53/10; F04B 53/102; F02D 41/3082; F02M 37/08; F02M 57/027; F02M 59/466; F16K 15/14; F16K 15/145
See application file for complete search history.

(56) References Cited

U.S. PATENT DOCUMENTS

| | | | |
|---|---|---|---|
| 3,625,248 A | 12/1971 | Lhotellier | |
| 3,874,487 A | 4/1975 | Keijzer et al. | |
| 4,240,434 A | 12/1980 | Newkirk | |
| 4,624,347 A | 11/1986 | Mourray | |
| 4,747,475 A | 5/1988 | Hagwood et al. | |
| 4,782,925 A | 11/1988 | Grundei | |
| 4,917,181 A | 4/1990 | Kiernan | |
| 4,934,907 A | 6/1990 | Kroner | |
| 5,022,832 A | 6/1991 | Lauterbach et al. | |
| 5,413,195 A | 5/1995 | Murakami | |
| 5,727,594 A | 3/1998 | Chokski | |
| 5,813,500 A | 9/1998 | Deferme | |
| 5,881,759 A | 3/1999 | Andersson | |
| 6,240,962 B1 | 6/2001 | Tai et al. | |
| 6,276,498 B1 | 8/2001 | Kirchner | |
| 6,382,372 B1 | 5/2002 | Keil et al. | |
| 6,390,130 B1 | 5/2002 | Guala | |
| 6,401,749 B1 | 6/2002 | Tai et al. | |
| 6,405,750 B1 | 6/2002 | Rogala | |
| 7,096,883 B2 | 8/2006 | Gessat et al. | |
| 8,016,088 B2 | 9/2011 | Morita | |
| 8,528,591 B2 | 9/2013 | Pirk et al. | |
| 8,794,265 B2 | 8/2014 | Handke et al. | |
| 8,955,654 B2 | 2/2015 | Nygren et al. | |
| 9,033,123 B2 | 5/2015 | Kobayashi et al. | |
| 9,121,524 B2 | 9/2015 | Ashiba | |
| 9,188,117 B2 | 11/2015 | Ito et al. | |
| 10,082,088 B2 | 9/2018 | Marocchini et al. | |
| 10,393,208 B2 | 8/2019 | Knezevic et al. | |
| 2002/0176786 A1 | 11/2002 | Hirose et al. | |
| 2004/0182446 A1 | 9/2004 | Semeia | |
| 2005/0051395 A1 | 3/2005 | Deferme | |
| 2012/0085323 A1* | 4/2012 | Allen | F02M 59/464 123/472 |
| 2013/0061939 A1* | 3/2013 | Leppert | F16N 37/00 137/15.01 |
| 2014/0217318 A1 | 8/2014 | Schlick et al. | |
| 2015/0034437 A1 | 2/2015 | Yamada | |
| 2016/0237973 A1 | 8/2016 | Bleeck et al. | |
| 2017/0120321 A1 | 5/2017 | Teramoto et al. | |
| 2017/0204930 A1 | 7/2017 | Miwa et al. | |
| 2017/0268469 A1* | 9/2017 | Plisch | F04B 15/06 |
| 2017/0321643 A1* | 11/2017 | Krause | F02M 69/02 |
| 2019/0003474 A1 | 1/2019 | Fochtman et al. | |
| 2019/0003598 A1 | 1/2019 | Fochtman et al. | |
| 2019/0003603 A1 | 1/2019 | Craven et al. | |

FOREIGN PATENT DOCUMENTS

| | | | |
|---|---|---|---|
| DE | 1911534 U | 9/1970 | |
| DE | 102014208614 A1 | 11/2015 | |
| JP | S57171 | * 1/1982 | ............. F04B 39/10 |
| JP | S57171 Y2 | 1/1982 | |
| JP | S595783 U | 1/1984 | |

OTHER PUBLICATIONS

International Search Report and the Written Opinion of the International Searching Autority dated Oct. 2, 2018 for corresponding PCT application No. PCT/US2018/040757.
File history for U.S. Appl. No. 16/023,663, including the Notice of Allowance dated May 25, 2020.
File history for U.S. Appl. No. 16/023,988, including non-final Office Action dated Mar. 6, 2020.

* cited by examiner

PUMP VALVE CONFIGURATION AND ASSEMBLY METHOD

CROSS REFERENCE TO RELATED APPLICATIONS

The present application claims the benefit of the following provisional applications filed on Jul. 3, 2017: application No. 62/528,348, titled "Combined Inlet and Outlet Check Valve Seat"; application No. 62/528,345, titled "Asymmetric Spring Valve Disk"; application No. 62/528,356, titled "Hydraulic Damping of a Solenoid"; application No. 62/528,412, titled "Fuel Pump Valve Configuration and Assembly"; application No. 62/528,351, titled "Fuel Pump Solenoid Assembly Method"; and application No. 62/528,417, titled "Fuel Sending Unit Assembly and Operation." The content of these provisional patent applications are incorporated by reference herein in their entirety.

FIELD OF INVENTION

This invention relates to a valve assembly for a fluid pump, and particularly to a method of constructing and utilizing same.

BACKGROUND

It is common for existing positive displacement pumps to utilize a pair of check valves arranged in such a way that when the piston moves and expands the volume of the pump chamber, the inlet check valve opens, allowing a fluid from the source to flow into the pump chamber. When the pressure inside the pump chamber increases to a level similar or equal to the source, the moving portion of the check valve is typically urged to close. The pump chamber substantially full of fluid at this stage. When the piston moves in a way to reduce the pump chamber volume, the pressure increases and generally opens the outlet check valve, pushing fluid from the pump into the sink of fuel line.

In small fluidic pumps, check valves are often a ball bearing spring type check valve. Fluid pumps using this style check valves work well at low cycling frequencies and relatively low flow. When the design of system requires the pump to operate at varying frequencies and flow rates, this style check valve does not perform well. The response speed of this style valve is typically limited by the (relatively) large mass ball, the ball (valve) stroke and the closing spring with insufficient force to close at high speed. At frequencies above the critical frequency for the check valve's return spring, the valves don't close quickly enough and backflow occurs reducing the volumetric efficiency of the pump. During endurance testing of pumps using these valves, the mechanical components wear due the mass of the valve element when driven at high speed. As this mechanical wear progresses, the dynamic performance of the valve begins to change. For example, as the spring wears, causing the valve to open at a lower pressure and the weakened spring closes the valve more slowly. If the pump is a metering pump, this change in dynamic behavior changes the output flow or pressure, or changes the required work the pump must perform to maintain the performance prior to the dynamic response shift.

In a small positive displacement fuel pump, where repeatable cycle-to-cycle performance is required as well as consistent delivery of fuel, this style valve failed to be capable. These valves exhibited high levels of cycle-to-cycle variation of quantity of fuel delivered, especially at high frequency due to backflow. This performance characteristic worsened during endurance testing. The fuel pump with this style check valve was also not capable of delivering equal quantities of fuel at low frequency and high frequency creating a low pressure condition in the fuel system. Further, these valves are difficult to package into a pump design while maintaining a small pump chamber dead volume, which leads to poor priming performance.

SUMMARY

According to an example embodiment, there is disclosed a valve assembly for a fluid pump, including a valve body; a fluid inlet and a fluid outlet; an inlet disk movably disposed in the valve body; and an outlet disk movably disposed in the valve body. A valve seat is fixed within the valve body and includes a disk member having at least one first aperture defined axially through the disk member, and at least one second aperture defined axially through the disk member, the inlet disk and the valve seat forming an inlet valve and the outlet disk and the valve seat forming at least part of an outlet valve. An inlet chamber is disposed upstream of the inlet valve, a pump chamber is disposed between and in fluid communication with the inlet valve and the outlet valve, and an outlet chamber is disposed downstream of the outlet valve. The inlet chamber surrounds the outlet chamber.

In one aspect, a fluid inlet passage disposed between and in fluid communication with the fluid inlet and the inlet chamber, wherein the fluid inlet passage is disposed immediately beneath or adjacent the inlet chamber and at least a portion of the inlet chamber is disposed immediately beneath or adjacent the inlet valve.

In another aspect, a bushing is disposed in the valve body and has a bore defined through a longitudinal axis of the bushing, and a plunger movably disposed within the bore of the bushing. The inlet disk is biased in a first position covering the at least one first aperture when the inlet valve is in a closed state and in a second position in contact with a first surface of the bushing when the inlet valve is in an open state, the first surface being along a bottom end portion of the bushing. The bushing may include a second surface along the bottom end portion of the bushing which does not contact the inlet disk when the inlet disk is in the second position, with the first surface and the second surface forming a step.

An outer diameter of an end portion of the bushing proximal the valve seat may be inwardly tapered. An inner diameter of an end portion of the bushing proximal to the valve seat may include a radially outwardly step.

In another aspect, an outlet spring is disposed in the valve body and having a first longitudinal end and a second longitudinal end, the first longitudinal end contacting the outlet disk and biasing the outlet disk against the valve seat. A spring retainer is disposed within the valve body, the outlet spring is at least partly disposed in the spring retainer, and a first longitudinal end of the spring retainer serves as a stop for the outlet disk when the outlet disk moves from the valve seat.

In a further aspect, the valve assembly includes a plurality of fluid outlet passages disposed between and in fluid communication with the outlet chamber and the fluid outlet, wherein the spring retainer includes an aperture defined at or near a second longitudinal end of the spring retainer such that a fluid outlet passage of the plurality of fluid outlet passages passes through the spring retainer. The outlet chamber and the fluid outlet passages are configured relative to the outlet valve such that a direction of fluid flow through the outlet valve is orthogonal to a direction of fluid passing through the at least one of the outlet chamber and the fluid outlet passages.

An aspect is directed to a thickness of the spring retainer at the first longitudinal end thereof being less than a thickness of the spring retainer in a central region thereof. Stated another way, an inner surface of the spring retainer is radially outwardly tapered at the first longitudinal end of the spring retainer so as to increase the inner diameter of the spring retainer at the longitudinal first end thereof.

In another aspect, a space between the plunger and a surface of the bore of the bushing is sized to allow air to pass through the space when the fluid pump is being primed.

DETAILED DESCRIPTION

Figure 1:
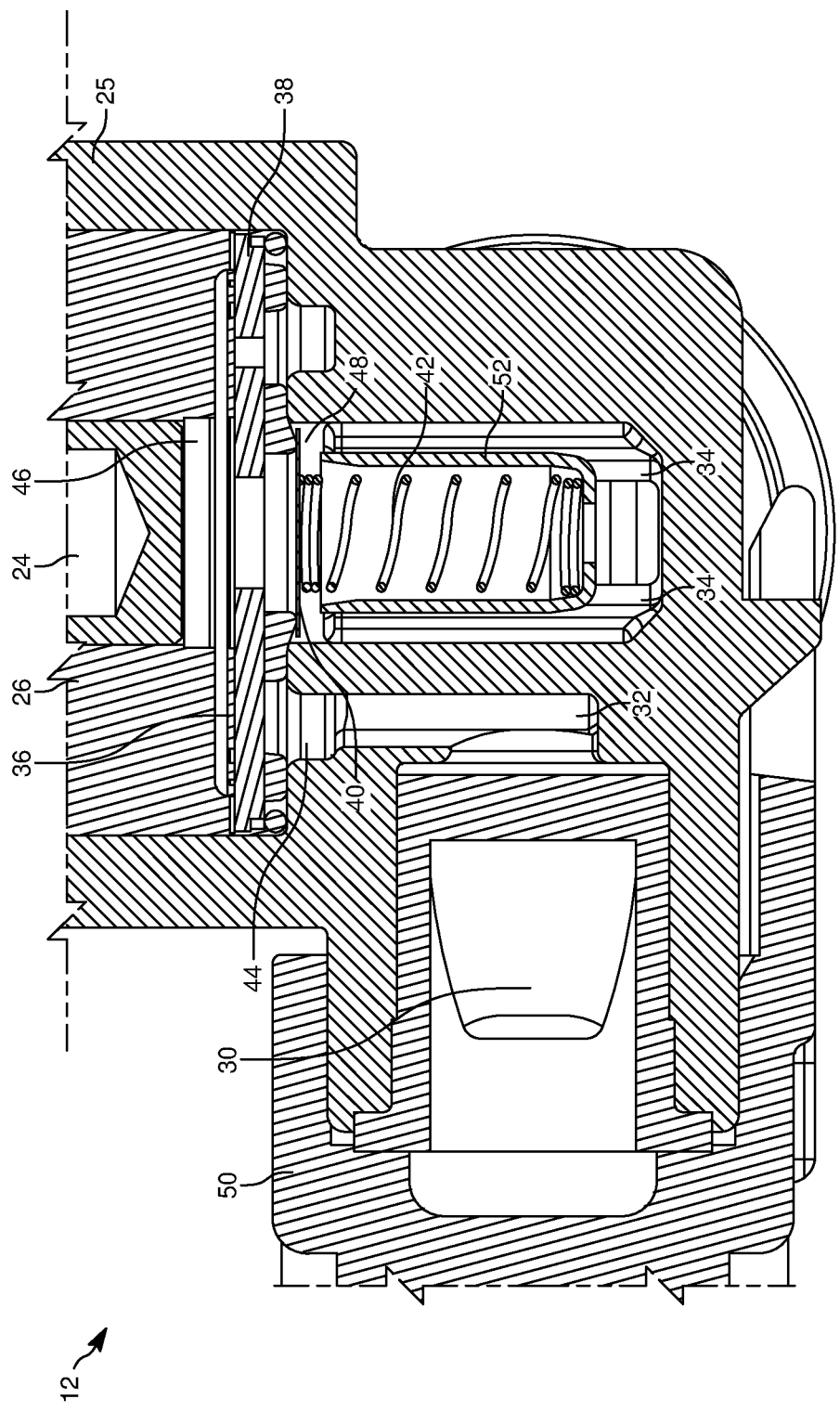
FIG. 1 is a cross sectional view of a portion of the valve group of the fuel pump according to an example embodiment.

Example embodiments are generally directed to a valve group or valve assembly for a fuel pump which pumps fuel into a fuel line of an apparatus, such as a two or four wheeled vehicle, having a gasoline combustion engine. The fuel pump is configured to be submerged within the fuel tank of the vehicle or other apparatus of which the fuel pump is a part. The pump is controlled by an ECU of the apparatus. The valve group includes an inlet check valve and an outlet check valve which include a combined valve seat. The valve group is operatively connected to a solenoid power group or assembly to form the fuel pump.

The example embodiments are directed to the valve group of a fuel pump. The pump provides a filtered, metered by volume of fuel "sent" from the tank to the fuel line (not shown) at the proper pressure. This "sent" fuel keeps a fuel line at the proper pressure for the fuel injector (not shown) ported to the other end of the fuel line. This allows for the removal of the return line, inline filter and a pressure regulator. The pump is commanded by an electronic control unit (ECU) and generally runs synchronously with the timing of the fuel injector which is also controlled by the ECU (not shown), actuation to provide the fuel at the proper time.

It is understood that references to "upstream" and "downstream" herein are relative to the direction of fuel flow through the valve group pump. It is further understood that relative terms such as "top," "bottom," "above," "below" and "beneath" are relative to fuel pump components as viewed in the drawings herein and not necessarily to the particular orientation of the components when the fuel pump is disposed in a fuel tank.

Figure 2:
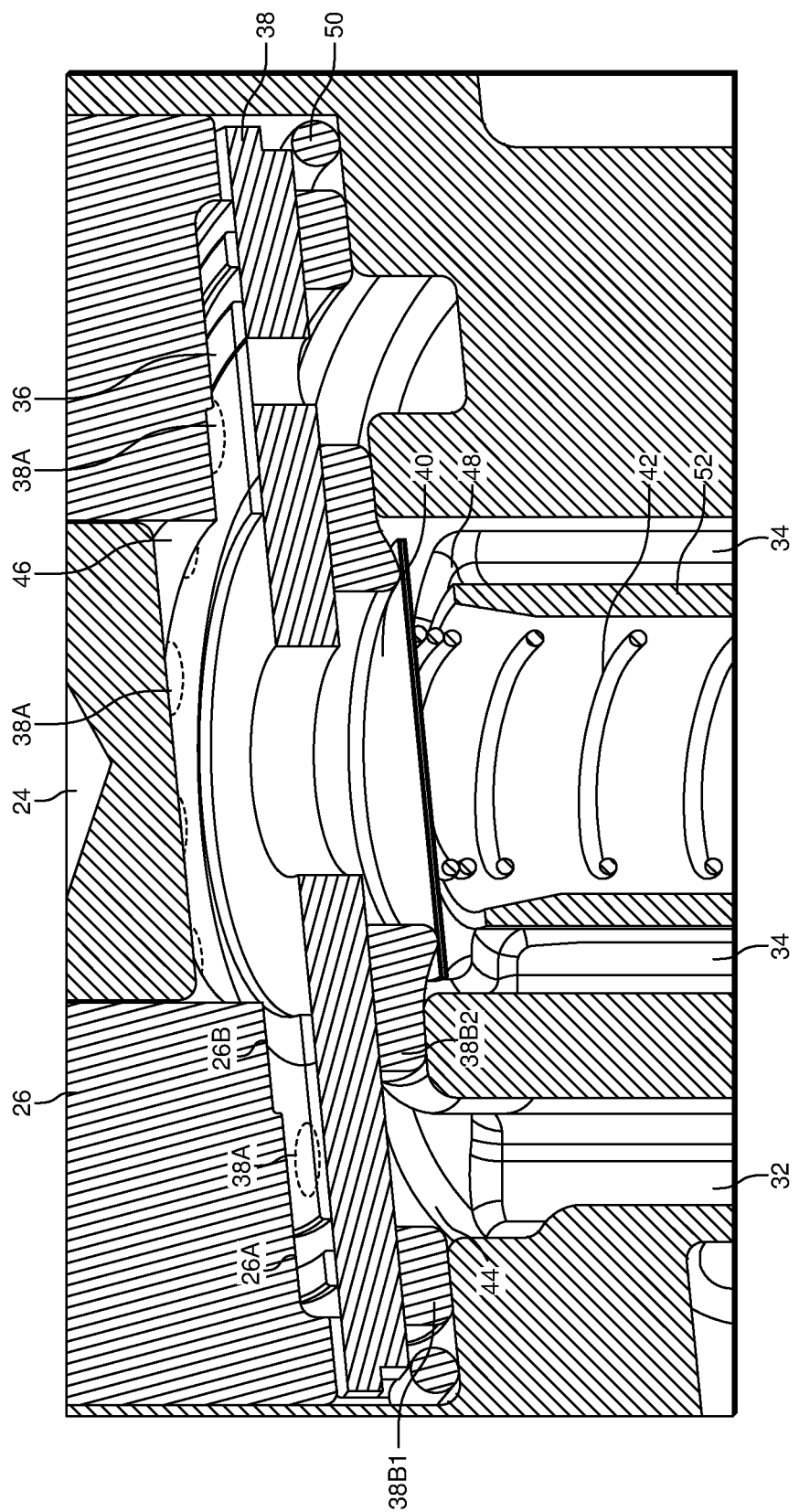
FIG. 2 is an expanded perspective view of the valve group portion of the fuel pump of FIG. 1.
Figure 3:
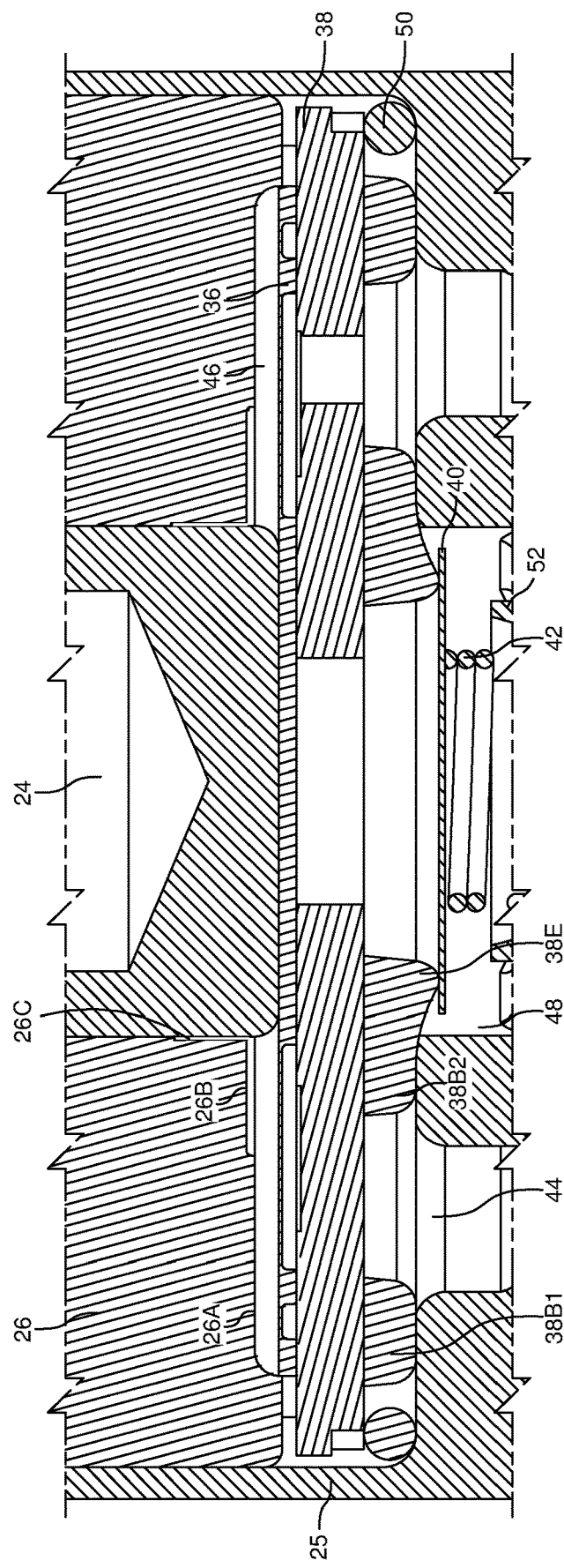
FIG. 3 is a cross sectional view of the valve group portion of the fuel pump of FIG. 1.

As shown in FIGS. 1-3, a valve group or assembly 12 includes a pump body 25, a bushing 26 at least partly disposed in pump body 25 and having a through-hole in which a plunger 24 is movably displaced, and a protection valve 30 disposed within the pump body 25. Plunger 24 is connected to an armature of the solenoid power group (not shown) so that the protection valve 30 is under control of the power group to which the valve group 12 is connected.

Pump body 25 includes a fuel inlet passage 32 (FIG. 1) defined therein in which fluid which passes through the protection valve 30 flows. The pump body 25 further includes one or more fluid outlet passages 34 through which fuel passes prior to exiting the pump body 25. Disposed between the fuel inlet passage 32 and the fuel outlet passage 34 is an inlet disk 36, a valve seat 38 and an outlet disk 40. The valve seat 38 is fixedly disposed within the pump body 25. Best seen in FIGS. 2 and 3, a portion of the inlet disk 36 is movably disposed between the bushing 26 and the valve seat 38, and the outlet disk 40 is disposed downstream of the valve seat 38. An outlet spring 42 is disposed within the pump body 25 to bias the outlet disc 40 against the valve seat 38. The inlet disk 36 and the valve 38 seat serve as an inlet check valve of the valve group 12, and the outlet disk 40, outlet spring 42 and the valve seat 38 serve as the outlet check valve of the valve group 12. A longitudinal axis of the fluid inlet passage 32 is perpendicular to a lateral or radial axis of the valve seat 38, and a longitudinal axis of each fluid outlet passage 34 is perpendicular to a direction of fuel flow exiting the valve seat 38.

Within the pump body 25 are a number of chambers for holding fuel. Referring to FIGS. 1-3, an inlet chamber 44 is formed at least partly within fuel inlet passage 32 upstream of inlet disk 36. A pump chamber 46 is defined at least partly within the through-hole of bushing 26 in which plunger 24 is disposed, and includes the space downstream of inlet disk 36 and upstream of outlet disk 40. An outlet chamber 48 is disposed downstream of outlet disk 40 and is at least partly defined within the fuel outlet passages 34. As indicated in FIGS. 1 and 2, the inlet chamber 44 encircles or surrounds the outlet chamber 44. The outlet chamber 48, and particularly the wall of the pump body 25 which at least partly defines the outlet chamber 48, acts as a radial guide for the outlet disk 40 during movement thereof.

The generally cylindrical plunger 24 is co-axially disposed with the longitudinal axis of the bushing 26. To reduce or minimize the volume of the pump chamber 46, the tip of the plunger 46 during certain portions of fuel pump operation is below the "stop" surface of the inlet disk 36 and is very close to the valve seat 38, while at other times, the plunger 46 is above such stop 26A of the bushing and within the tight clearance of the bushing 26 that mates with the plunger 24 to make a "seal" while operating. This seal is made by having a relatively small diametrical clearance gap (e.g., 5-15 microns) which is difficult for fuel to leak through during a compression stroke yet helps during priming of the fuel pump by allowing air in the pump chamber 46 to exit without requiring the air to pass into the fuel line.

Best seen in FIG. 3, the end portion 26A of the bushing 26 proximal to the valve seat 38 has an outer diameter which is smaller than the outer diameter of the bushing 26 that is not proximal to the valve seat 38. In an example embodiment, the outer diameter of the bushing 26 is radially inwardly tapered and in another example embodiment, the outer diameter of the bushing 26 has a radial inward step. The bushing 26 having a smaller outer diameter allows proper or improved seating of the inlet and outlet valves (e.g., the valve seat 38, the inlet disk 36 and the outlet disk 40) inside the pump body 25.

Further, the inside diameter of the bushing 26 is smaller at the end portion proximal to the valve seat 38 than elsewhere along the bushing 26, with the end portion corresponding to the portion of the bushing 26 which the tip of the plunger 24 travels through during normal operation. In an example embodiment, the inner diameter of the bushing 26 at the end portion near the valve seat 38 includes a radially outwardly relief step 26C. This outward relief step 26C of the bushing 26 proximal to the valve seat 38 helps prevent wearing and binding of the tip of the plunger 24.

Figure 4:
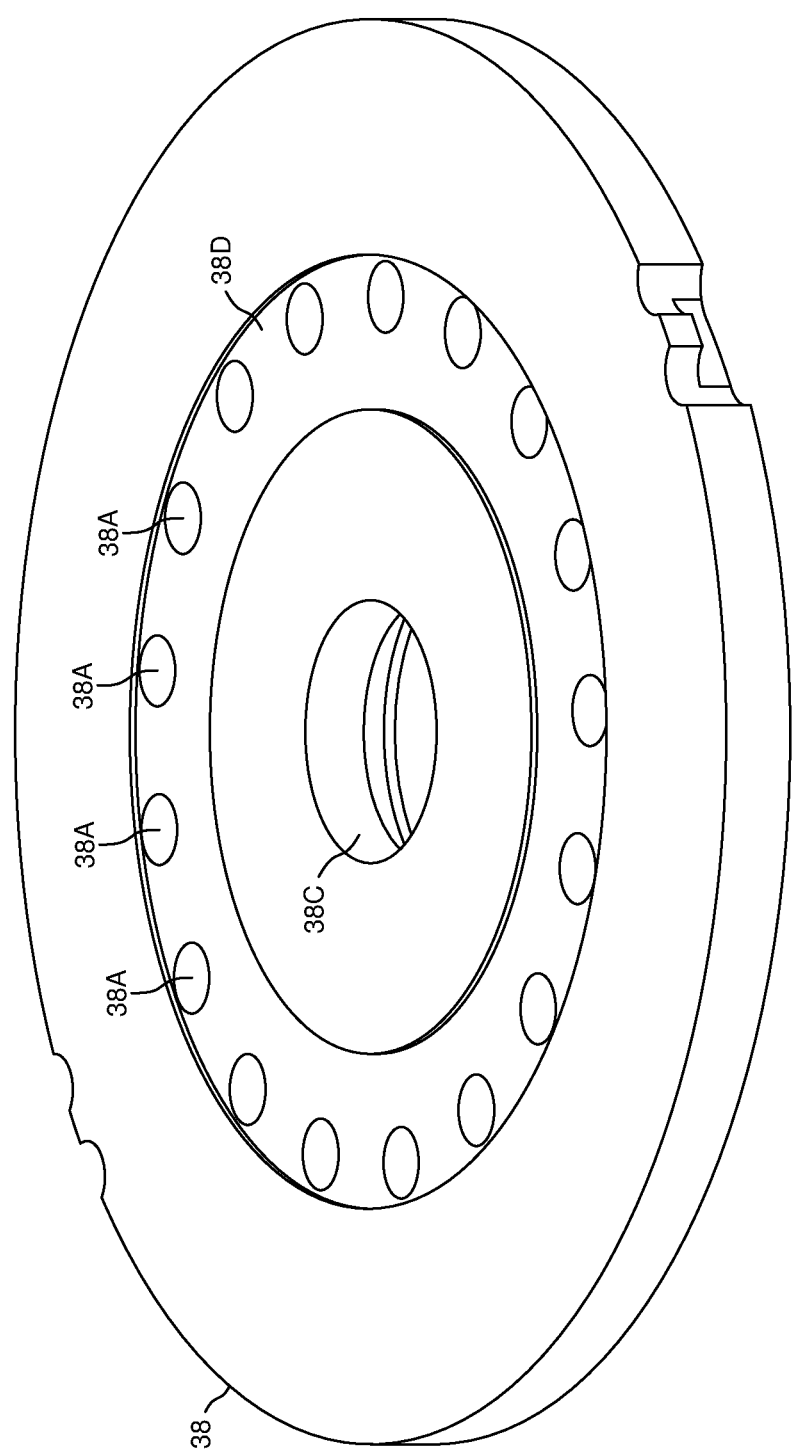
FIG. 4 is a perspective top view of the valve seat of the valve group of FIG. 1.
Figure 5:
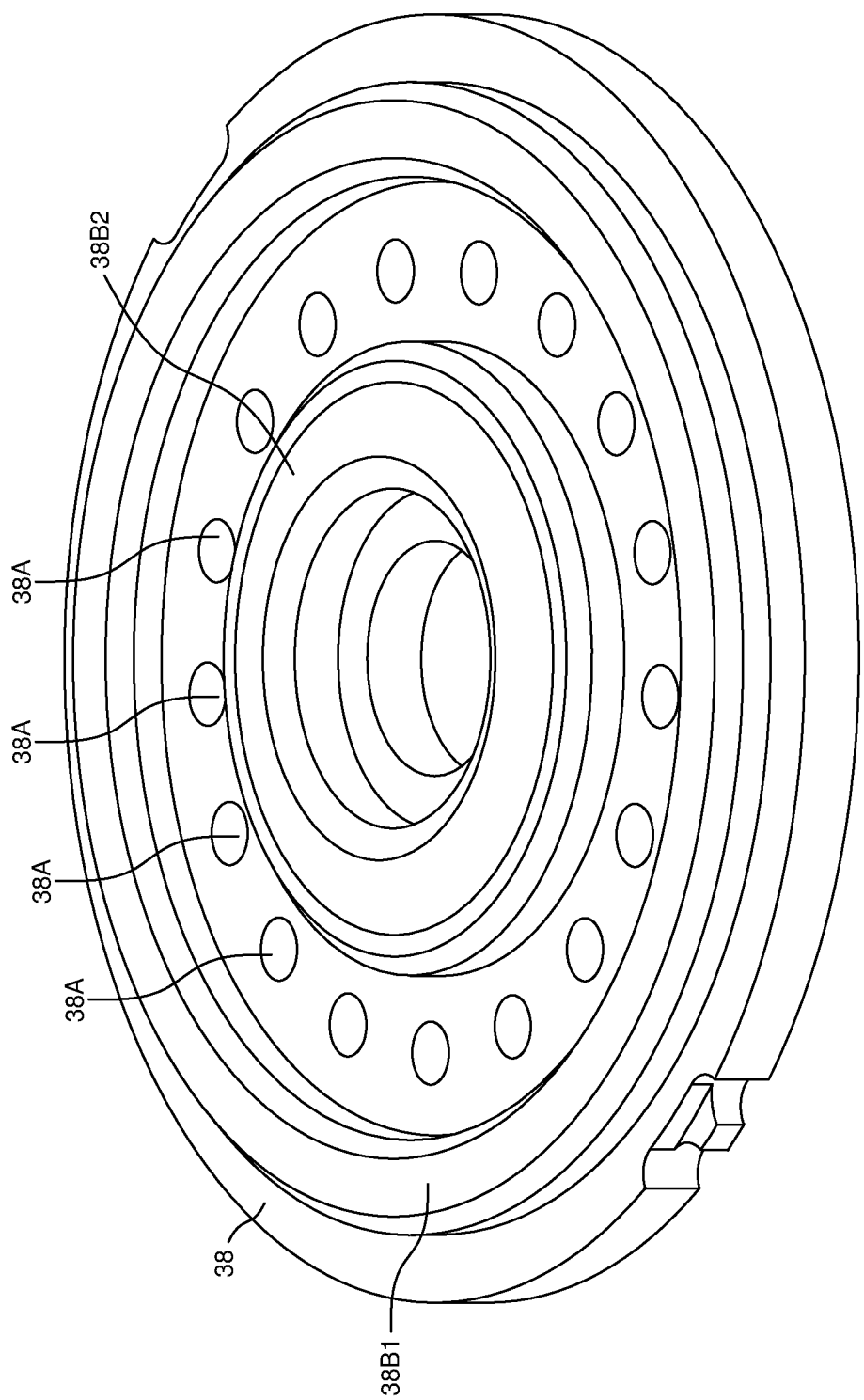
FIG. 5 is a perspective bottom view of the valve seat of the valve group of FIG. 1.

Best seen in FIGS. 4 and 5, the valve seat 38 is a disc or cylindrical shaped member constructed from metal, plastic or similarly rigid material. Valve seat 38 includes a plurality of apertures 38A defined axially or nearly axially through the seat. In the example embodiment illustrated, the apertures 38A surround a radial center of the valve seat 38, and are evenly distributed about the center and arranged in a bolt circle pattern. The number and size of apertures 38A may vary dependent upon the particular application of the valve group 12. At least one aperture 38A is disposed directly above the inlet chamber 44. Fuel passing from the inlet chamber 44 to the pump chamber 46 pass through the apertures 38A and urge a portion of the inlet disk 36 away from the valve seat 38, thereby opening the inlet check valve and forming a fuel path into the pump chamber 46. Apertures 38A surround an aperture 38C defined axially through a radial center of the valve seat 38. Aperture 38C has a larger diameter than the diameter of apertures 38A.

The valve seat 38 includes a relatively shallow groove 38D defined along the upper surface of the seat. A downstream end of each aperture 38A is located within the groove 38D. This groove 38D is at least the width of the apertures 38A, and runs or extends 360 degrees around the valve seat 38, ensuring each of the apertures 38A is within the groove 38D. The groove depth may vary but is generally not more than half of the thickness of the valve seat 38D itself.

Figure 6:
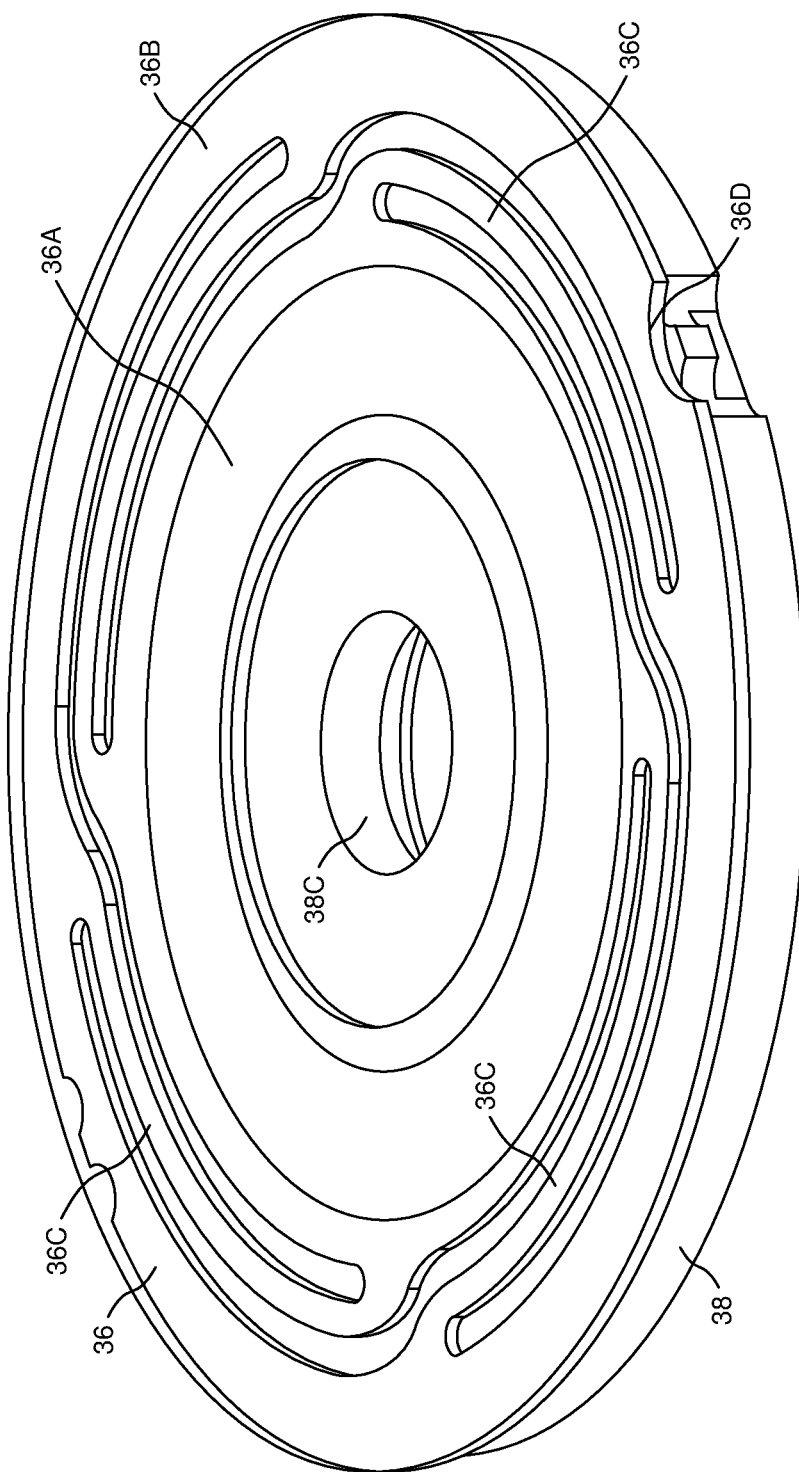
FIG. 6 is a perspective top view of the valve seat and inlet disk of the valve group of FIG. 1.

The top of the valve seat 38 is flat and/or planar and has a polished finish to aid in sealing since the inlet disk 36 contacts the polished area. As best shown in FIG. 6, the inlet disk 36 only covers up the radial outer portion of the top surface of the valve seat 38 and the apertures 38A along with the groove 38D. The radial center portion of the valve seat 38, where the aperture 38C is located, is not covered up by the inlet disk 36. The inlet interface between the valve seat 38 and the inlet disk 36 is metal-to-metal and both parts are flat and smooth in order to provide a seal. This inlet disk 36 seals with the valve seat 38 on either side of the groove 38D so a large amount of the inlet disk 36 does not actually touch the valve seat 38. The groove 38D allows reduced or minimal contact between the inlet disk 36 and the top of the valve seat 38, as well as allows the inlet fluid pressure to communicate to a significant area of the inlet disk 36 during operation of the valve group 12, as discussed in greater detail below. The space within the groove 38D and the space in the apertures 38A form part of the inlet chamber 44.

The bottom surface of the valve seat 38 has two radially separated but concentric, raised seat rings 38B molded onto and extending from the bottom surface, as shown in FIG. 5. The seat ring 38B1 is the radially outermost seat ring 38B which is bonded in between the outer diameter of the valve seat 38 and the bolt circle of apertures 38A. The seat ring 38B2 is bonded in between the center aperture 38C and the apertures 38A. This seat ring 38B has an extra protrusion or lip 38E (FIG. 3) added along the inner diameter of the ring so as to extend in an axial direction further away from the inlet disk 36 than the rest of the seat ring 38B2 and the seat ring 38B1. Along this protrusion 38E is where the flat, circular outlet disk 40 sealing contacts the bottom of the valve seat 38 and provide a seal between the pump chamber 46 and the outlet chamber 48. Best seen in FIGS. 2 and 3, the inlet chamber 44 is at least partly defined between the two seat rings 38B, and the pump chamber 46 is partly defined in the space in the center aperture 38C and the space within the inner seat ring 38B2. The rings 38 are constructed from a resilient, elastic and/or compressible material, such as rubber. Seat ring 38B2 provides a sealing surface for the outlet disk 40, and seat rings 38B1 and 38B2 provide sealing surfaces for a wall within the valve body 25 so as to at least partly define the inlet chamber 44 and the fuel inlet passage 32, as shown in FIGS. 2 and 3. In addition to providing a sealing contact and controlling fuel flow between the pump chamber 46 and the outlet chamber 48, the seat ring 38B2 also provides a seal between the inlet chamber 44 and each of the pump chamber 46 and the outlet chamber 48. The seat ring 38B1 provides a seal between the inlet chamber 44 and the pump chamber 46.

As mentioned, a portion of the inlet disk 36 is displaceable between the bushing 26 and the valve seat 38. As shown in FIGS. 2 and 3, the bushing 26 includes a stop 26A having a first surface against which part of the inlet disk 36 contacts when the inlet disk 36 is separated from the valve seat 38 which allows fuel to pass from the inlet chamber 44 to the pump chamber 46. The height of the stop 26A is used to control the maximum stress in the inlet disk 36 to be less than the finite life fatigue limit of the material of the inlet disk 36, while allowing enough opening separation of the inlet disk 36 from the valve seat 38 to not limit the intake flow rate. The bushing 26 also includes a step 26B having a second surface which in the illustrated embodiment is disposed radially inwardly of the stop 26A so as to reduce the contact surface of the bushing 26 with the inlet disk 36, thereby providing easier separation thereof when the inlet disk 36 returns to its position against the valve seat 38.

Referring to FIG. 6, which depicts the inlet disk 36 and the valve seat 38 in a stacked arrangement, the inlet disk 36 includes a radially inner portion 36A and a radial outer portion 36B. In the example embodiment illustrated, the outer portion 36B is fixed within the valve body 25. Absent pressure forces, the inner portion 36A of the inlet disk 36 is disposed over the groove 38D of the valve seat 38, such that the inner portion 36A contacts both of the radial inner edge surface and the radial outer edge surface which define the radial extent of the groove 38D. Connected between the inner portion 36A and the outer portion 36B are a plurality of legs or webs 36C. Legs 36C extend between the inner portion 36A and the outer portion 36B and are configured so as to serve as a spring for allowing the inner portion 36A to be lifted or otherwise elevated relative to the outer portion 36B, while urging the inner portion 36A towards the valve seat 38 once the lifting force is lessened. In the example embodiments, during energizing of the solenoid of the power group, to which the valve group 12 is operatively coupled, causes the plunger 24 to move away from the valve seat 38, thus increasing the size of the pump chamber 46 and creating a pressure differential between the inlet chamber 44 and the pump chamber 46. This pressure differential, when exceeding the bias force associated with the legs 36C, causes the inner portion 36A of the inlet disk 36 to separate from the valve seat 38 and move towards the bushing 26, thereby allowing fuel to pass through apertures 38A. Subsequently, when the solenoid is de-energized, the plunger 24 moves towards the valve seat 38 so as to decrease the size of the pump chamber 46 and increase the pressure therein, the inner portion 36A moves away from the bushing 26 and returns to its original position largely in the same plane as the outer portion 36B. In an example embodiment, one or more of the legs 36C is sized differently so as to provide an asymmetric spring in which a first section of the inner portion 36A is lifted away from the valve seat 38 prior to other sections of the inner portion 36A lifting from the valve seat 38, and another section of the inner portion 36A moves from the bushing 26 to the valve seat 38 prior to other sections of the inner portion 36A doing same. In an example embodiment, each leg 36C is configured differently from each of the other legs 36A.

The apertures 38A of the valve seat 38, being evenly distributed about the radial center of the valve seat 38 create equal or near equal exposure of the inner portion 36A of the inlet disk 36 at any radial orientation of the inlet chamber 44 of the pump body 25, which reduces part-to-part variation and/or the requirement for radial orientation of the valve seat 38 within the pump body 25 during assembly.

Referring to FIGS. 1 and 2, the outlet spring 42 is housed in a spring retainer 52, which is shaped similarly to a cup. The inner surface of the outlet disk spring retainer 52 starts generally cylindrical in shape and then tapers radially outwardly at a distance above the top of the retainer, so as to increase the inner diameter and decrease the thickness at the top of the retainer. The taper of the inner surface helps to center the outlet spring 42 and keep the spring from being pinched, since the top of the outlet spring retainer 52 is also the valve stop of the outlet valve, which sets the stroke of the outlet disk 40. The wall thickness for the outlet spring retainer 52 is mostly constant, and the taper on the inside surface is similar on the outer surface too. This surface taper on the outside of the retainer 52 ensures a clean press fit into three ribs at the base of the valve body 25 in the fuel outlet passages 34.

During normal operation of the fuel pump, the solenoid power group is actuated by applying a current to the solenoid which builds a current-generated magnetic force that begins moving the armature of the power group to which the plunger 24 is connected. The plunger 46 moves away from the valve seat 38 which increases the size of the pump chamber 46 and lowers the pressure therein. The lower pressure in the pump chamber 46 creates a differential pressure across the inlet disk 36. The shallow groove 38D on the valve seat 38, which faces and is adjacent the inlet disk 36, allows for the pressure of the inlet chamber 44 to be communicated to a large surface area, increasing the differential pressure and helping the valve group 12 be resistant to viscosity-driven stiction which would slow the separation of the inlet disk 36 from the valve seat 38. Once the differential pressure across the inlet disk 36 exceeds the ability of the disk's internal spring (i.e., legs 36C) to hold the disk 36 against the seat 38 in the sealed or position of the inlet check valve, the inlet disk 36 will open with the inner portion 36A lifting from the valve seat 38. In particular, the differential pressure across the inlet disk 36 lifts the inner portion 36A of the inlet disk 36 at the least stiff location of the asymmetric spring formed by the legs 36C in order to trigger a peeling effect and improve the repeatability and shortening of the opening time of the inlet disk 36. To further take advantage of the asymmetry of the inlet disk 36, the radial location of the weakest/least stiff spot of the asymmetric spring portion on the disk is marked with a notch 36D. This notch 36D is used to orient the inlet disk 36 to align the least stiff part of the disk to be directly above the fuel inlet passage 32 feeding the inlet chamber 44. This allows for the fuel coming directly from the protection valve 30 to have a generally straight path through the flow apertures 38A on the valve seat 38 and impinge on the inlet disk 36, providing more separation of the inlet disk 36 which reduces the time required to fill the pump chamber 46. It may take the entire remainder of the cycle for the inlet chamber 44 to reach pressure stabilization with the fuel tank in which the fuel pump is disposed. The solenoid remains activated/energized for a short period of time following completion of the full stroke of the armature and the plunger 24 in order to allow the pump chamber 46 to fill completely. As the pressure of the pump chamber 46 approaches the pressure of the inlet chamber 44, the incoming fuel velocity decreases. The asymmetry of the inlet valve disk 36 is also used during the separation from the bushing 26 in that the separation from the bushing starts at the portion of the inlet disk 36 influenced by the stiffest spring effect and then the disk 36 peels off from the bushing 26 and returns to the valve seat 38. This occurs when the momentum of the incoming fuel is reduced sufficiently, such that the inner portion 36A of the inlet disk 36 peels off from the stop 26A of bushing 26, which is stepped at step 26B to reduce the contact surface of the bushing 26 with the inlet disk 36 and returns to the valve seat 38 which stops the incoming fuel flow into the pump chamber 46.

As the solenoid power group is de-energized and the magnetic field in the solenoid decays, the armature of the solenoid is pushed by a calibration spring and the resulting motion of the plunger 24 increases the pressure in the pump chamber 46. When the differential pressure between the pump chamber 46 and the outlet chamber 48 exceeds the load of the outlet valve spring 42, the outlet disk 40 separates from the protrusion 38E of the seat ring 38B2 on the valve seat 38 and the fuel flows from the pump chamber 46 into the outlet chamber 48. The fuel flow exiting the pump chamber 46 is turned 90 degrees before reaching the fuel outlet port which imparts momentum to the low mass outlet disk 40. Adding to the forces designed to move the outlet disk 40 to allow full flow in less than 1 millisecond, the fuel flow is pushed through a small annulus between the outer diameter of the outlet disk 40 and the walls of the valve body 25 to create a high velocity which takes advantage of the high drag coefficient of the thin, sharp edge outlet disk 40. This drag and transferred momentum leads to nearly digital (open/closed) motion of the outlet disk 40. As the outlet disk 40 is forced away from the valve seat ring 38B2, the forces are adding potential energy into the outlet spring 42. The fuel exiting the pump 100 passes through the three fuel outlet passages 34 (FIG. 1) on the way to the outlet port and into the fuel line. There is also a small hole at the base of the outlet spring retainer 52 which allows for the equalization of pressure inside and outside of the retainer while the outlet disk 40 is forced against the stop at the rim or top of the retainer 52. This equalization of the pressures reduces the separation time for the outlet disk 42 from the rim and/or outlet disk stop of the outlet spring retainer 52. The outlet disk stop also has a small contact area to reduce fluidic stiction between the outlet disk 40 and the stop to further improve separation time and consistency. As the fuel exits the outlet chamber 48, the plunger 24 approaches the valve seat 38.

Figure 7:
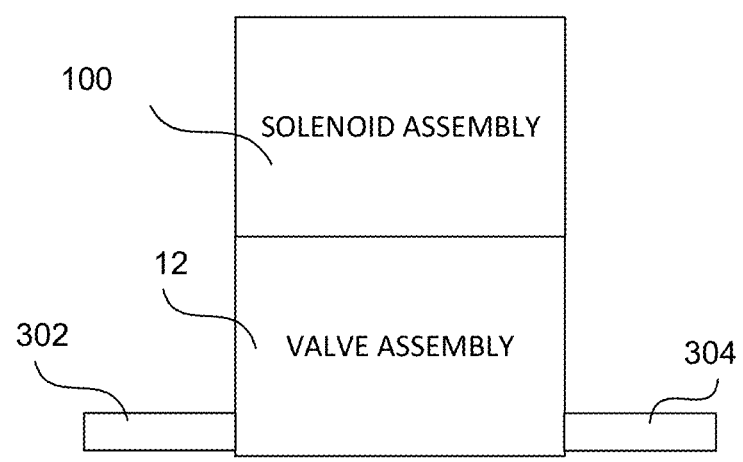
FIG. 7 is a diagram of a fuel pump having therein the valve group of FIG. 1.

FIG. 7 is a block diagram illustrating a fluid pump 10 having a solenoid power group or assembly 100 coupled to a valve group 12. In the illustrated example embodiment, the fluid pump 10 is a fuel pump but it is understood that the fluid pump 10 may be used to pump other fluids in other applications. The valve group 12 is operatively coupled to the solenoid power group 100 for pumping fuel from a fluid inlet 302 to a fluid outlet 304 of the valve group 12. The fluid outlet 304 is configured for connection to a fluid line (not shown) for supplying the fluid under pressure. An ECU (not shown) controls the solenoid power group 100 to move the armature therein in a reciprocating manner, which causes fuel to flow from the fluid inlet 302 to the pump chamber 46 via the inlet chamber 44 and the inlet valve, and to flow from the pump chamber 46 to the fluid outlet 302 via the outlet chamber 48 and the outlet valve, as described above. The particular features of the solenoid power group 100 and the fluid pump 10 may include the features described in the U.S. patent applications identified in the cross reference section above.

Example embodiment would be very useful in other fluid pumping applications that operate at high frequencies and work on the principle of positive displacement pumps using an inlet and outlet check style valves. The valve configuration described above allows for a very compact valve group 12 and fuel pump 100 with relatively small displacements for very high flows. Any pumping application where space is limited would be a good fit for the disclosed embodiments.

The valve seat 38 may be constructed from molded plastic with a secondary process of molding the seat rings 38 to the plastic. The valve seat 38 may be photoetched, with a secondary process of molded rubber sealing rings for the apertures 38A and/or 38C. The valve seat 38 may be stamped or coined, with a secondary process molded rubber to form the sealing rings.

The valve seat 38 may be raised or offset along the outside diameter of the top of the seat. This allows the inlet disc 36 to be clamped to the valve seat 38 at different heights.

The valve seat 38 may be made similarly to what was described above, but instead of having a metal-to-metal sealing interface on the inlet side of the seat, the rubber molding process may add rubber to the outer diameter of each aperture 38A of a given height. The flatness of the valve seat 38 does not need to be controlled tightly because the rubber rings around each aperture 38A may conform to easily seal against the inlet disk 36. While the sealing surface of the apertures 38A are raised, the inlet disk 36 may be still flush to the valve seat 38. This means that the inlet disc 36 is spring-loaded against the rubber inlet which gives the fuel pump 10 an inlet cracking pressure. This height may be adjusted in order to adjust the cracking pressure of the inlet disc to the desired number.

In certain situations or designs, a certain amount of leak through the inlet is required to be controlled. In this case, a secondary grinding process can be done to the top of valve seat. For instance, radial grooves starting from the direct center of the disc can be grinded onto the valve seat that extend towards the outside of the disc 360 degrees around the part. Depth of the grooves caused by grinding can be changed in order to minimize leak. This helps since your are controlling the leak in the direction intended across the sealing surfaces between the Inlet disc and valve seat.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

We claim:

1. A valve assembly for a fluid pump, comprising:
a valve body;
a fluid inlet and a fluid outlet defined in the valve body;
an inlet disk movably disposed in the valve body;
an outlet disk movably disposed in the valve body;
a valve seat fixed within the valve body and comprising a disk member including at least one first aperture defined axially through the disk member, and at least one second aperture defined axially through the disk member, the inlet disk and the valve seat forming at least part of an inlet valve and the outlet disk and the valve seat forming at least part of an outlet valve; and
an inlet chamber disposed upstream of the inlet valve, a pump chamber disposed between and in fluid communication with the inlet valve and the outlet valve, and an outlet chamber disposed downstream of the outlet valve,
wherein the inlet chamber surrounds the outlet chamber;
wherein the valve assembly further comprises
an outlet spring disposed in the valve body and having a first longitudinal end and a second longitudinal end, the first longitudinal end contacting the outlet disk and biasing the outlet disk against the valve seat;
a spring retainer disposed within the valve body, the outlet spring being at least partly disposed in the spring retainer, wherein a first longitudinal end of the spring retainer being a stop for the outlet disk when the outlet disk moves from the valve seat; and
a plurality of fluid outlet passages in fluid communication between the outlet chamber and the fluid outlet, wherein the spring retainer includes an aperture defined at or near a second longitudinal end of the spring retainer such that a fluid outlet passage of the plurality of fluid outlet passages passes through the spring retainer.

2. The valve assembly of claim 1, further comprising a fluid inlet passage disposed between and in fluid communication with the fluid inlet and the inlet chamber, wherein the fluid inlet passage is disposed immediately beneath the inlet chamber and at least a portion of the inlet chamber is disposed immediately beneath the inlet valve.

3. The valve assembly of claim 1, further comprising:
a bushing disposed in the valve body and having a bore defined through a longitudinal axis of the bushing; and
a plunger movably disposed within the bore of the bushing,
wherein the inlet disk is biased in a first position covering the at least one first aperture when the inlet valve is in a closed state and in a second position in contact with a first surface of the bushing when the inlet valve is in an open state, the first surface being along an end portion of the bushing.

4. The valve assembly of claim 3, wherein the bushing comprises a second surface along the end portion of the bushing which does not contact the inlet disk when the inlet disk is in the second position, the first surface and the second surface forming a step, and the second surface is disposed radially inwardly of the first surface.

5. The valve assembly of claim 3, wherein an outer diameter of an end portion of the bushing proximal the valve seat is inwardly tapered.

6. The valve assembly of claim 3, wherein an inner diameter of an end portion of the bushing proximal to the valve seat includes a radially outwardly step.

7. The valve assembly of claim 1, wherein the outlet chamber and the fluid outlet passages are configured relative to the outlet valve such that a direction of fluid flow through the outlet valve is orthogonal to a direction of fluid passing through the at least one of the outlet chamber and the fluid outlet passages.

8. The valve assembly of claim 1, wherein a thickness of the spring retainer at the first longitudinal end thereof is less than a thickness of the spring retainer in a central region thereof.

9. The valve assembly of claim 1, wherein an inner surface of the spring retainer is radially outwardly tapered at the first longitudinal end of the spring retainer so as to increase an inner diameter of the spring retainer at the first longitudinal end thereof.

10. The valve assembly of claim 3, wherein a space between the plunger and a surface of the bushing is sized to allow air to pass through the space when the fluid pump is being primed.

11. A valve assembly for a fluid pump, comprising:
a valve body;
a fluid inlet and a fluid outlet;
an inlet disk movably disposed in the valve body;
an outlet disk movably disposed in the valve body;
a valve seat fixed within the valve body and comprising a disk member including at least one first aperture defined axially through the disk member, and at least one second aperture defined axially through the disk member, the inlet disk and the valve seat forming at least part of an inlet valve and the outlet disk and the valve seat forming at least part of an outlet valve;
an outlet spring disposed in the valve body and having a first longitudinal end and a second longitudinal end, the first longitudinal end contacting the outlet disk and biasing the outlet disk against the valve seat;
a spring retainer disposed within the valve body, the outlet spring being at least partly disposed in the spring retainer, wherein a first longitudinal end of the spring retainer is a stop for the outlet disk when the outlet disk moves from the valve seat;
an outlet chamber disposed downstream of the outlet valve; and
a plurality of fluid outlet passages defined between and in fluid communication with the outlet chamber and the fluid outlet,
wherein the outlet chamber and the fluid outlet passages are configured relative to the outlet valve such that a direction of fluid flow through the outlet valve is orthogonal to a direction of fluid passing through the fluid outlet passages.

12. The valve assembly of claim 11, further comprising an inlet chamber disposed upstream of the inlet valve, and a fluid inlet passage disposed between and in fluid communication with the fluid inlet and the inlet chamber, wherein the fluid inlet passage is disposed immediately beneath the inlet chamber and at least a portion of the inlet chamber is disposed immediately beneath the inlet valve.

13. The valve assembly of claim 12, further comprising:
a bushing disposed in the valve body and having a bore defined through a longitudinal axis of the bushing; and
a plunger movably disposed within the bore of the bushing,
wherein the inlet disk is biased in a first position covering the at least one first aperture when the inlet valve is in a closed state and in a second position in contact with a first surface of the bushing when the inlet valve is in an open state, the first surface being along an end portion of the bushing.

14. The valve assembly of claim 13, wherein the at least one first aperture comprises a plurality of apertures disposed evenly about the inlet chamber such that the inlet disk is evenly exposed to fluid passing through the inlet chamber and through the plurality of apertures.

15. The valve assembly of claim 13, wherein the bushing comprises a second surface along the end portion of the bushing which does not contact the inlet disk when the inlet disk is in the second position, the first surface and the second surface forming a step, the second surface defines part of a fluid path through the valve assembly that is downstream of the inlet valve and upstream of the outlet valve.

16. The valve assembly of claim 11, further comprising:
an inlet chamber disposed upstream of the inlet valve, and
a pump chamber disposed between and in fluid communication with the inlet valve and the outlet valve, wherein the inlet chamber surrounds the outlet chamber.

17. The valve assembly of claim 11, wherein the spring retainer includes an aperture defined at or near a second longitudinal end of the spring retainer such that a fluid outlet passage of the plurality of fluid outlet passages passes through the spring retainer.

18. The valve assembly of claim 17, wherein the outlet chamber is sized so that the outlet chamber forms a radial guide for the outlet disk.

19. The valve assembly of claim 16, wherein a thickness of the spring retainer at the first longitudinal end thereof is less than a thickness of the spring retainer in a central region thereof.

20. The valve assembly of claim 16, wherein an inner surface of the spring retainer is radially outwardly tapered at the first longitudinal end of the spring retainer so as to increase an inner diameter of the spring retainer at the first longitudinal end thereof.

21. The valve assembly of claim 11, wherein a space between the plunger and a surface of the bushing is sized to allow air to pass through the space when the fluid pump is being primed.

22. A valve assembly for a fluid pump, comprising:
a valve body;
a fluid inlet and a fluid outlet defined in the valve body;
an inlet disk movably disposed in the valve body;
an outlet disk movably disposed in the valve body;
a valve seat fixed within the valve body and comprising a disk member including at least one first aperture defined axially through the disk member, and at least one second aperture defined axially through the disk member, the inlet disk and the valve seat forming at least part of an inlet valve and the outlet disk and the valve seat forming at least part of an outlet valve; and
an inlet chamber disposed upstream of the inlet valve, a pump chamber disposed between and in fluid communication with the inlet valve and the outlet valve, and an outlet chamber disposed downstream of the outlet valve,
a bushing disposed in the valve body and having a bore defined through a longitudinal axis of the bushing; and
a plunger movably disposed within the bore of the bushing,
wherein the inlet disk is biased in a first position covering the at least one first aperture when the inlet valve is in a closed state and in a second position in contact with a first surface of the bushing when the inlet valve is in an open state, the first surface being along an end portion of the bushing, wherein the bushing comprises a second surface along the end portion of the bushing which does not contact the inlet disk when the inlet disk is in the second position, the first surface and the second surface forming a step, and the second surface is disposed radially inwardly of the first surface, and wherein the second surface defines part of a fluid path through the valve assembly that is downstream of the inlet valve and upstream of the outlet valve, the second surface defining part of the fluid path with the pump chamber when the inlet disk is in both the first position and the second position.

23. The valve assembly of claim 22, wherein an end portion of the bore of the bushing proximal to the valve seat includes a radially outward step.

24. The valve assembly of claim 23, wherein the second surface of the bushing and the radially outward step of the bore of the bushing meet along an edge defining an end of both the second surface of the busing and the radially outward step of the bore of the bushing.

* * * * *